Aug. 13, 1935.  W. MÖLLER  2,011,453
COMPRESSED FLUID OPERATED APPARATUS
Filed March 21, 1935
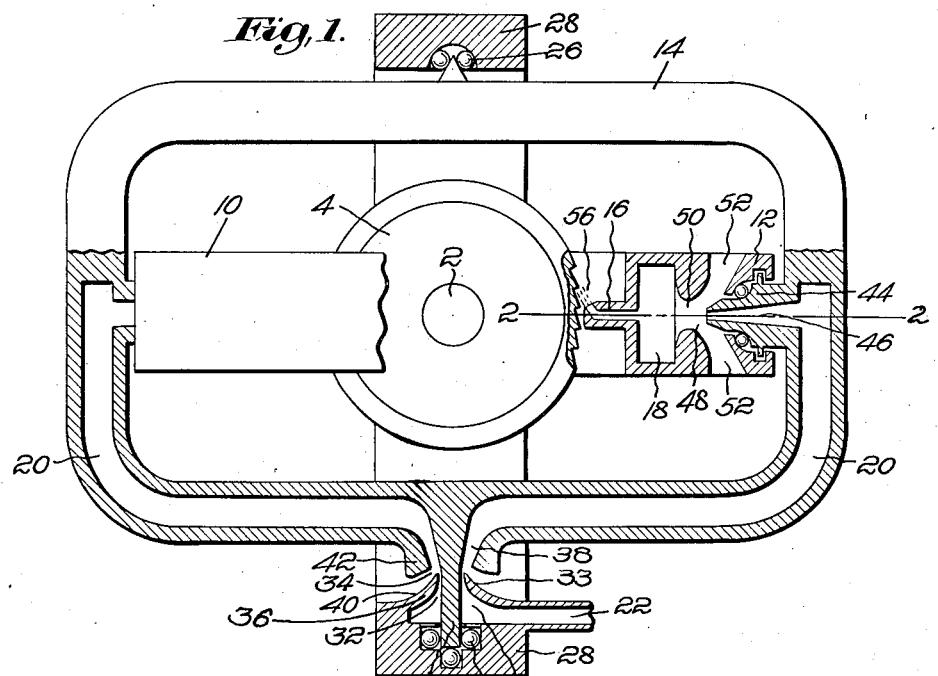
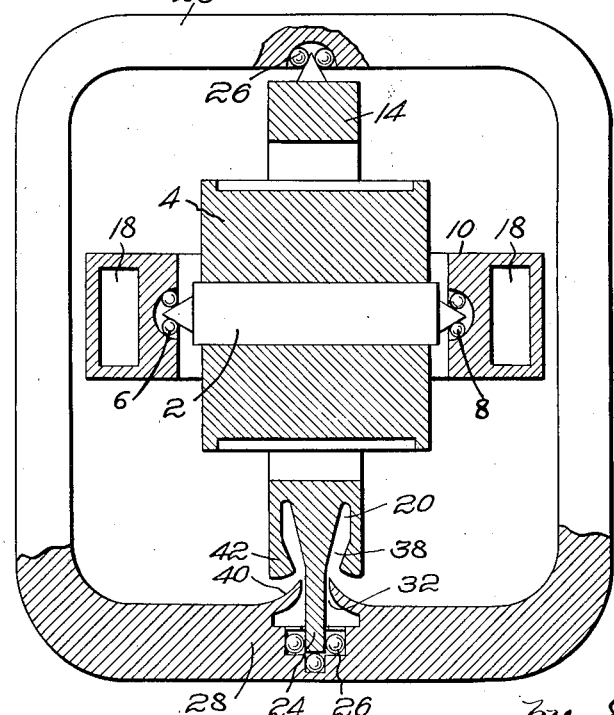
Inventor:
Waldemar Möller,
by Edward H. Palmer,
Atty.

Patented Aug. 13, 1935

2,011,453

UNITED STATES PATENT OFFICE 2,011,453

COMPRESSED FLUID OPERATED APPARATUS

Waldemar Möller, Klein-Machnow, near Berlin, Germany, assignor to Askania-Werke-A. G. Vormals Central Werkstatt Dessau und Carl Bamberg-Friedenau, a German company Application March 21, 1935, Serial No. 12,334
In Germany March 2, 1934

3 Claims. (Cl. 74—5)

This invention relates to apparatus and instruments operated by compressed air or other compressed fluid. The rotary parts of many instruments and apparatus, such as the rotors of gyroscopes for example, are generally driven by compressed air, particularly when used on aircraft. As in such case, however, furnishing the compressed air power or energy is always at the expense of the useful output, whether such power be derived directly or indirectly from the driving motor, or from special apparatus or from compressed air cylinders. The compressed air energy must be carefully conserved, particularly when a considerable number of apparatus are to be supplied. Special difficulties arise where the several apparatus must be supplied with compressed air at different pressures. As in order to save weight, in the case of aircraft for example, the use of only one source of compressed air is practicable, means must be provided to vary the air pressure supplied to the several apparatus according to the requirements of each, the higher pressure supplied to one apparatus being reduced for another, etc. Heretofore, this has usually been accomplished by the use of throttling valves. This, however, entails a considerable loss or waste of the compressed air energy. Other difficulties arise when the compressed air is supplied to the movable parts through a bearing axis as heretofore such bearings had to be protected against loss of power and volume by special packings, so called labyrinth packings for example. Apart from the fact that loss of pressure is disadvantageous for the reasons above given, the so essential free operation or rotation of the parts, particularly the gyroscope parts for example, in their bearings, requires a very painstaking and laborious working of said bearings, which materially increases the cost of the apparatus.

All these difficulties and disadvantages are eliminated by the present invention.

The invention and its aims and objects will be readily understood from the following description, taken in connection with the accompanying drawing of one embodiment of the invention herein given for illustrative purposes, the true scope of the invention being more particularly pointed out in the appended claims.

In the drawing:

Fig. 1 is a front sectional elevation of one illustrative embodiment of the invention;

Fig. 2 is a horizontal sectional detail on line 2—2 of Fig. 1;

Fig. 3 is a side elevation, partly in section, of the parts shown in Fig. 1 viewed from the right side of said figure.

In the accompanying drawing the invention is shown illustratively in its application to gyroscopes, more particularly an azimuth gyroscope having the spinning shaft 2 of its rotor 4 rotatable in suitable bearings 6, 8 in a frame 10. The frame 10 is rotatable about a horizontal axis passing through bearings 12 in a vertical frame or gimbal ring 14. Only one of these bearings is shown in vertical section in Fig. 1. The gyroscope rotor 4 is spun by an air blast issuing from a jet nozzle 16 supplied with compressed air from any suitable source (not shown) such as a compressor for example, through a passage 18 provided in the Cardan frame 10 communicating with a passage 20 provided in said vertical frame 14 and supplied with compressed air by supply passage 22.

While in similar apparatus heretofore the compressed air passes from the fixed passage 22 into the passage 20 in the first movable frame through bearings cut off and protected from the outer air by labyrinth packings, and in some cases also from said passage 20 into the passage 18 of the second movable frame through a bearing similarly cut off and protected from the outer air by similar packings, it will be noted that, in accordance with the present invention, the bearings through which the passage of compressed air is effected from a fixed part through a relatively movable part, are formed as jet blasts as will now be described.

Referring more particularly to Fig. 1 and to the lower bearing of said vertical frame 14, the latter terminates in or is provided with a journal 24 received in an enclosed ball bearing 26 in the fixed frame 28. Said frame 14 is thus rotatable in bearings 26—26 of said fixed frame 28. Above said bearing 26 the supply passage 22 opens into a chamber 26′ having an outlet 32 surrounding and co-axial with said journal 24. The interior cross section of said outlet where it surrounds said journal is slightly greater than the cross section of the latter at that point. There is thus formed an annular nozzle 33 about said journal. An annular intake port 34 provided in a boss 36 projecting from the base of the frame 14 surrounds said journal 24. The cross sections of said port 34 and of said annular nozzle opening 32 are so proportioned that a jet blast of the greatest possible efficiency results. Preferably the exterior cross section of said journal will gradually increase from the point where it is surrounded by said port, inwardly, while the walls of the passage 38 into which said port 34 opens gradually diverge from said journal, the cross section of said passage 38 thus gradually increasing inwardly toward the point where it opens into the passage 20, in the nature of a Venturi tube. Preferably also the surface 40 of the fixed frame 28 and the opposed end surface 42 of the boss 36 will converge approaching the port 34, so that the annular space formed by said two surfaces about the journal 24 will diminish in cross section from its outer edge toward its inner edge, in the nature of a Venturi tube.

The bearings 12 by which the horizontal frame 10 is mounted for rotation in said vertical frame 14 may be of the same construction as bearing 26 just described. In the illustrative embodiment of the invention shown, however, frame 14 carries a journal 44 which is received in said ball bearing 12 provided in said frame 10. Said journal 44 has an axial bore 46 communicating at its outer end with said passage 20 and the cross section of said bore will preferably diminish gradually from its outer toward its inner end. This journal thus forms a nozzle 48 discharging through the center of an intake port 50 in the frame 10 which opens into said passage 18, the latter connecting with said jet nozzle passage 16 from which the compressed air is discharged to spin the rotor 4.

The passage 18 will preferably extend away from said port 50 in opposite directions and it will be seen that the walls of said intake port 50 gradually converge in curved lines from the intake side of said port 50 toward the center of said port and then gradually diverge in curved lines on the side of said port opening into said passage 18, similar to a Venturi tube; that is to say, the interior cross section of said port gradually diminishes approaching its center and then gradually increases from said point outwardly.

Lateral air supply passages 52, 52 may be provided leading from atmosphere to said port, the cross section of said passages gradually diminishing as they approach said port resembling a Venturi tube formation.

In Fig. 2 there will preferably be a part 59 opposite said port on the inner wall of said passage and terminating in a relatively sharp edge to assist in directing the compressed air entering through said port 50 into the right and left portions of said passage 18. It will be seen from Fig. 2 that the cross section of said passage 18 gradually diminishes, Venturi-tube like as it approaches said port. In this figure the compressed air enters the nozzle passage 16 through the two converging passages 54, 54.

In operation, if compressed air be supplied to passage 22, it will expand on issuing from the annular nozzle 32, and striking the intake port 34, it will produce a current or blast of compressed air which flows from the nozzle 48 and creates a corresponding pressure in the passage 18. A blast of compressed air 56, suitable to spin the rotor of the gyroscope issues from the nozzle 16 More air is thus drawn in from the atmosphere through the Venturi tube like annular space between the surfaces 40 and 42 and is carried into the intake port 34 and passage 20 with the compressed air blown from the annular nozzle 33.

The provision of an air jet blast in the bearings in accordance with the present invention enables the greater part of the energy developed by the compressed air on leaving the nozzles 32 and 40 of relatively small cross section, to be utilized to compress the air within the passages 20 and 18, as well as the air drawn in by the blast from the atmosphere. While therefore in apparatus of this kind heretofore used, the reduction of the pressure of the compressed air supply to the working pressure desired was effected by throttling valves or the like, thus completely wasting the energy of expansion, such energy is practically completely regained by applicant's invention in the form of pressure, and the amount of air available for operating purposes will be increased by the amount of air drawn in from the surrounding atmosphere. Apparatus used in applicant's invention, therefore, operate with the greatest efficiency. Another advantage pertaining to applicant's invention is the complete elimination of packing of any and all kinds for the bearings. The necessary free untrammeled operation is thus secured much better and much more simple than in apparatus heretofore used. It is well known that the use of labyrinth or analogous packings often results in a binding of the packing due to the accumulation of dirt and oil, which may result in a complete failure of the entire apparatus. In the case of sensitive apparatus it has therefore generally been necessary to resort to a suction drive in place of the more efficient blast drive. As in bearings embodying applicant's invention there is no contact between parts exposed to the action of the compressed air, there can be no disturbance or impairment of the operation of the apparatus resulting from the presence of oil in the compressed air used.

I am aware that my present invention may be embodied in other specific forms than that herein described without departing from the spirit or essential attributes thereof, and I therefore desire the present embodiment of said invention to be considered in all respects as illustrative and not restrictive, reference being had to the appended claims rather than to the foregoing description to indicate the scope of the invention.

I claim:

1. Apparatus, more particularly for use on aircraft, comprising compressed air driven means; a supporting member for said means containing a compressed air supply passage; journals carried by said member; a fixed member; bearings in said fixed member engaged by said journals; a compressed air supply passage leading into one of said bearings and terminating in an annular outlet opening surrounding the journal engaging said bearing, said supporting member being provided with a circular opening opposite said outlet opening, said circular opening communicating with the compressed air supply passage in said supporting member and surrounding said journal to form an annular intake port, the end surface of the wall of said intake port and the opposed outer surface of the wall of said outlet opening forming an air intake passage leading from the atmosphere to said intake opening, the cross section of said air intake passage diminishing gradually from its outer to its inner extremity.

2. Apparatus, more particularly for use on aircraft, comprising compressed air driven means; two supporting members for said means, the one provided with bearings and the other with journals engaging said bearings, one of said journals being bored axially to form a nozzle and communicating with a compressed air supply passage in the member carrying said bored journal; an intake port in the member provided with the bearing engaged by said bored journal, said intake port being opposite the discharge opening of said nozzle and communicating with a compressed air passage in said last named member, the inside wall of said intake port diverging substantially from its center outwardly in both directions, the member having the bearing engaged by said bored journal being provided with an air supply passage opening at one end to the atmosphere and at the other end toward said intake port, the interior cross section of said supply passage diminishing from its outer to its inner end.

3. In a fluid driven gyroscope of the class described, the combination of a stationary frame; an outer gimbal frame rotatably mounted on said stationary frame and having communicating air ducts terminating in nozzles; an inner gimbal ring having a driving nozzle for the rotor and rotatably mounted on said first named nozzles; and a fluid nozzle member on one frame terminating in a plane spaced from the end of the communicating air ducts whereby to provide an air intake opening; said inner gimbal ring having air intake openings about and terminating adjacent to said first named nozzles whereby said driving nozzle is supplied with fluid.

WALDEMAR MÖLLER.